Sept. 7, 1965  E. G. LAVIANO  3,204,311
JAM CLEAT
Filed June 6, 1962
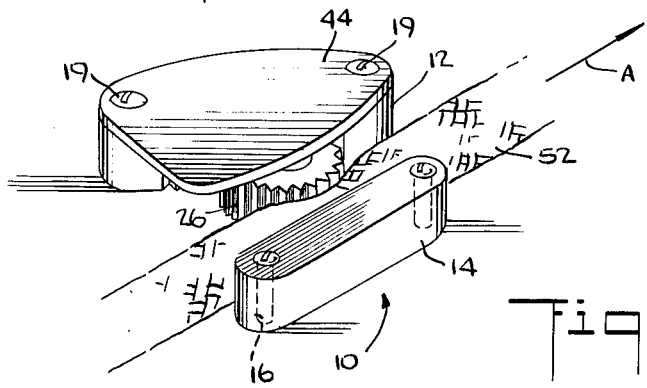
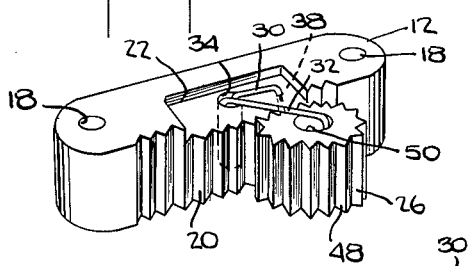
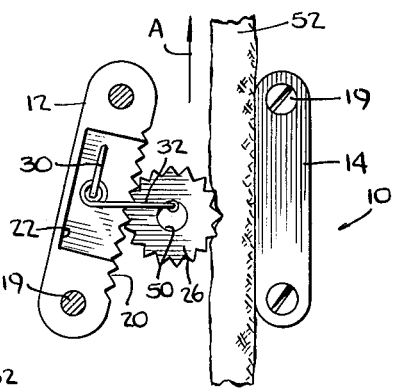
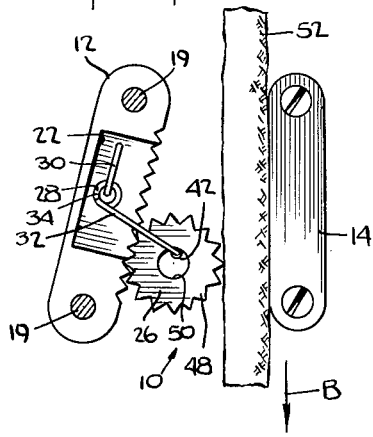
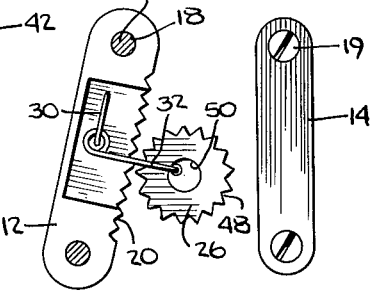
INVENTOR.
EDMUND G. LAVIANO

United States Patent Office 3,204,311
Patented Sept. 7, 1965

3,204,311
JAM CLEAT
Edmund G. Laviano, % Bellpat Marine Corp.,
64 Roe Blvd., Patchogue, N.Y.
Filed June 6, 1962, Ser. No. 200,426
5 Claims. (Cl. 24—126)

This invention relates to jam cleats, and, more particularly, to a novel gear action jam cleat.

Generally, jam cleats are employed where it is desired to be able to pull a rope smoothly in one direction against a load so as to put the rope under tension and upon release of the rope to have it releasably automatically locked against movement in the opposite direction. Jam cleats are used, for example, in marine equipment with working lines such as those used to trim a sail. In other words, such cleats are useful where it is necessary to tighten a rope and to have it locked immediately when the tightening force is released without further action by the user. It is important that jam cleats operate smoothly and reliably and under all weather conditions. Moreover, they must be able to take rough usage since they invariably are subjected to such treatment. Additionally, it is quite important that the cleats permit smooth movement of the rope in one direction regardless of the angle of pull and hold the rope against tension in the opposite direction regardless of the angle at which the tension is exerted.

Conventionally, jam cleats have been of the cam cleat and roller cleat types. Such cleats are subject to many disadvantages. For example, they tend to permit the rope to slip if the pull against which they are supposed to hold is exerted at certain angles to the cleat. Also, fairly close tolerances of the working parts of conventional cleats are required; this is a considerable drawback because these tolerances will not be maintained when the cleats are subjected to wear and usage and to natural forces in the marine field such, for example, as erosion, corrosion, salting up and accumulation of sand. As a result, after short periods of use the cleats freeze or begin to slip and thereby become useless. Still further, a given size cleat of the conventional type will accommodate only a limited range of diameters of ropes, thus causing inconvenience, limiting the use of cleats of any specific size and necessitating the acquisition of many different size cleats for use with different sizes of rope.

Conventional cam type jam cleats have the additional drawback that the cam teeth rapidly wear out since the same teeth are always used for the gripping. Such wear quickly renders the cleat useless because slippage occurs. Also, a loose line can, on certain movements such as a fluttering one, open the cam cleat, this being extremely undesirable.

It is a principal object of the present invention to provide a gear action jam cleat having none of the disadvantages of conventional jam cleats.

It is another object of the present invention to provide a cleat of the character described wherein wear of the gear teeth is greatly minimized.

It is another object of the present invention to provide a cleat of the character described wherein the holding action is not affected by the angle of exertion, degree or constancy of the pull which the cleat is to hold against.

It is another object of the present invention to provide a cleat of the character described wherein close tolerances of the working parts thereof are not required so that the cleat is not subject to undesired jamming or slipping because of wear or the effects of natural forces such as erosion, corrosion, salting up, accumulation of sand or the like.

It is another object of the present invention to provide a cleat of the character described wherein a given cleat can accommodate a wide variety of rope sizes.

It is another object of the present invention to provide a cleat of the character described which is easily disassembled for cleaning, repairing and replacement of parts.

It is another object of the present invention to provide a cleat of the character described which can take a greater strain than the same size of conventional jam cleat.

It is another object of the present invention to provide a cleat of the character described which is not subject to undesired opening on movement of a loose line.

It is another object of the present invention to provide a cleat of the character described which is made of few and inexpensive parts and which can be inexpensively mass produced.

It is another object of the present invention to provide a cleat of the character described which is easy to use and is rugged, durable and long-lasting.

Other objects of my invention in part will be obvious and in part will be pointed out hereinafter.

My invention accordingly consists in the features of construction, combinations of elements, and arrangements of parts which will be exemplified in the cleat hereinafter described and of which the scope of application will be indicated in the appended claims.

In the accompanying drawings, in which I have shown one of the various possible embodiments of my invention, FIG. 1 is a perspective view of a gear action jam cleat constructed in accordance with the instant invention, the same being shown in locked condition holding a rope against tension exerted in the direction of the arrow A;

FIG. 2 is a perspective view of the gear and rack assembly of the cleat;

FIG. 3 is a top view of the cleat in free running, i.e. non-holding, condition with a rope being pulled through it in the direction of the arrow B; the assembly cover having been removed to show the relationship of the parts;

FIG. 4 is a view similar to FIG. 3 but with the cleat in holding (locked) position, the arrow A indicating the direction of rope tension;

FIG. 5 is a view similar to FIGS. 3 and 4 with no rope present and with the gear disengaged from the rack for rotation independent thereof; and FIG. 6 is a perspective view of the gear drive spring.

In general I carry out my invention by providing a gear action cleat that includes two blocks, to wit, a line (rope) backing block and a gear backing block. Said blocks are elongated and preferably of basically rectilinear configuration. The blocks are spaced from one another and are so arranged that they converge toward a point, the angle of convergence being acute, e.g. in the order of 20°. The blocks include confronting substantially straight sides and either are mounted on a base which in turn can be secured to the object on which it is desired to use the cleat or the blocks are mounted directly upon said object itself. The aforesaid straight side of the gear backing block includes a rack in the form of a straight series of gear teeth confronting a smooth straight side of the line backing block. A gear is provided which has a diameter less than the least space between the blocks, said gear having teeth that are dimensioned and shaped to mesh with the rack teeth. The gear is captively mounted with two limited freedoms of movement. One freedom of movement is in a direction parallel to and for a substantial distance along the rack. The second freedom of movement is in a direction transverse, e.g., perpendicular, to the length of the rack. This second freedom of movement is at least sufficient to permit deliberate disengagement of the gear and rack teeth. The mounting of the gear preferably is such that the gear is partially loose and yet will ride along the rack. The gear thus is guided for meshing movement along the rack between a first position proximal to the converging ends of the blocks and a second position distal to said ends. Desirably the gear is permitted some free play with respect to the mounting means so as to provide the second degree of freedom of movement. In the preferred form of my invention the mounting means oscillates (swings) about a center in back of the rack teeth and is loosely coupled to the gear, this combination creating a maximum of the second degree of freedom at a point between the two positions and a minimum of the second degree of freedom at the first said position. The cleat further includes biasing means for urging the gear along the rack toward the first position and biasing means, preferably the same as the first-named biasing means, for urging the gear against the rack teeth, preferably against the rack teeth at the first position.

A rope of appropriate size is fitted between the gear backing block and line backing block; the orientation of the cleat is such that the rope will be under tension in the direction of convergence of the blocks at the time that the holding function of the gear cleat is desired to be operative. The cleat will prevent movement of the rope in said direction because the rope is caught between the line backing block and the facing teeth of the gear, rotation of the gear itself being prevented by meshing thereof with the rack teeth. The transverse freedom of movement of the gear permits rotation thereof with respect to the rack in intermediate positions of the gear whereby different gear teeth are from time to time brought into play.

Referring now in detail to the drawings, the reference numeral 10 denotes a gear action jam cleat constructed in accordance with my present invention. Said cleat includes a gear backing block 12 and a line (rope) backing block 14. The blocks are substantially rectangular and may be assembled together on a base to be secured on the object on which the cleat is to be located or they may be secured directly to said object. For either purpose, openings 16 and 18 are provided in the line backing and gear backing blocks respectively, and the securement is preferably accomplished by screws 19, although nuts and bolts also can be used. Other securements such, for example, as rivets can be employed, but are less advantageous from the point of view of disassembly. Said blocks are mounted as aforesaid to converge at an acute angle, e.g., about 20°, with a long straight side of one block facing a long straight side of the other block.

The gear backing block is provided with a toothed straight set of rack teeth 20 on the long side thereof facing the line block. A short shallow rectangular recess 22 having an open side facing the line block is formed in the top of the gear backing block, and a drive spring assembly 24 for a gear 26 is located therein.

The assembly 24 includes an elongated helical torsion spring 28 formed with arms 30, 32 secured to opposite ends of the spring and extending from the upper end thereof at 90° angles with respect to the longitudinal axis thereof. The coil of the spring is bodily received in a well 34 in the recess, with the arm 30 extending over the recess. Said arm terminates in a short downward perpendicular tip 36 which is received in an opening 38 located in the recess and spaced from the well 34 (see FIGS. 2 and 6). By the foregoing structure the spring is firmly anchored in the recess. The arm 32 projects into the region between the blocks 12 and 14 and terminates in a long downwardly extending perpendicular reach 40 on which a bearing sleeve 42 is rotatably disposed. The drive spring assembly is held in place after it is mounted in the recess of the gear backing block by a cover plate 44 secured to the top of said block as by the aforesaid screws 19, and, therefore, said assembly cannot be removed from the recess when the cover is in place.

The gear 20 has a height approximately equal to that of the blocks 12, 14 and includes teeth 48 adapted to mesh with the teeth of the rack 20. The gear has a central opening 50 the diameter of which is considerably larger than that of the bearing 42, and said bearing is loosely received therein. The gear is assembled to the spring drive assembly before the gear backing block is secured to a vase or object. The spring biases the gear towards a position proximal to the converging ends of the blocks, and the gear is movable to a position distal to said ends. The loose mounting of the bearing in the central opening of the gear permits the latter to move away from and out of engagement with the gear rack when not urged into contact with the same by a rope.

With the exception of the spring and bearing, which desirably are made of an appropriate metal such as stainless steel or phosphor bronze, the various parts of the cleat are made of any suitable material such as hard wood, plastic, or stainless steel, bronze or brass. The space between the gear and the line backing block is upwardly unrestricted, i.e., open, so that a rope 52 can be freely inserted into or removed from said space from above.

The cleat operates as follows: The gear is biased by the spring toward the converging ends of the blocks so that the distance between the gear teeth facing the smooth straight side of the line backing block and said block is less than the cross-section on compression of the rope 52 to be used with the cleat. To fit the rope between the said teeth and the line block, the rope is laid over the confronting gear teeth and confronting smooth side of the line backing block, with the converging ends of the blocks extending in the direction of the tension against which the rope is to be held by the cleat. This direction is indicated by the arrows A in FIGS. 1 and 4. The rope is then pulled in the opposite direction, a shown by the arrow B in FIG. 3, while the rope is forced by the user against and between the gear and line backing block. This causes the rope to frictionally engage the top surface of the gear and to swing it towards the diverging ends of the blocks whereby the gear is moved back along the gear backing block and, therefore, away from the line block a sufficient distance to allow the rope to slip in between the gear and the line backing block. The rope is pulled as far as desired and then released. If the teeth of the gear facing the line backing block are not already in contact with the rope, the spring moves the gear forwardly along the gear backing block and, therefore, toward the line block so that said teeth are in contact with the rope. The tension in the direction of convergence of the blocks causes the rope to tightly wedge between the gear and the line backing block, and since the gear cannot turn because it meshes with the gear rack and the rope is gripped by the gear teeth, the rope is very securely held against slipping. The rope can be easily removed from the gear simply by lifting it upwardly.

Because the opening 50 is considerably larger than the cross-section of the bearing 42 there is considerable slop in the mounting of the gear thereon. As a result, when the rope is pulled in the direction of divergence of the blocks, the gear, which swings in that direction, sometimes becomes disengaged momentarily from the gear rack whereby it is free to rotate. This depends upon the angle of pull in the aforesaid direction, and by varying said angle the gear can be made to rotate through a few degrees whereby fresh teeth are made available for holding of the rope when it is released. In addition, the gear may be manually rotated when the rope is pulled in the direction of divergence of the blocks or when no rope is in the cleat. The result is that wear of gear teeth is distributed over all of them rather than occurring only at the teeth on a particular arc, and in this way the gear teeth last much longer.

As is apparent from the foregoing, a given size of the present cleat will accommodate a wide variety of sizes of rope, the reason being the divergence of the blocks and the ability of the gear to move in the direction of divergence. A given cleat can take any size of rope ranging from ropes having very small diameters to those having diameters that can barely be compressed and freely pulled between the gear teeth and the line backing block when the gear is in its distal position with respect to the converging ends of the blocks. In addition to the foregoing, a given cleat embodying the present invention can be set up to operate with larger ranges of cross-sections of ropes by varying the separation between the blocks and/or varying the angle of convergency thereof; however, as the rope becomes thicker, a maximum thickness is reached with respect to the depth of the blocks and gear of the given cleat beyond which that cleat will not be useful because it will not be deep enough to operate properly with the rope.

The instant cleat is not subject to undesired opening due to variation of the angle of tension against which it is holding or due to fluttering movement of a loose line. This is because the jamming force is always perpendicular to the rope and because the gear teeth are of uniform radial lengths.

The present cleat will stand great strains since the pulling forces are distributed over several mounting screws. Moreover, for very heavy strains, the number of screws can be increased. An ancillary result of the foregoing is that the materials of which the cleat is made can be of a light and inexpensive nature since they will not have to take excessive localized strains.

It will be appreciated further from the above that cleats embodying the present invention need not be built to close tolerances and thus are only slightly subject to malfunction caused by erosion, corrosion, salting up, sand or other factors.

It thus will be seen that I have provided a jam cleat which achieves the several objects of my invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. A gear action jam cleat, said cleat comprising
   (a) a base,
   (b) a single gear backing block,
   (c) a single line backing block,
   (d) means mounting said blocks on said base to converge at an acute angle with one surface of the gear backing block facing one surface of the line backing block,
   (e) said gear backing block including a toothed rack on the surface thereof facing the line backing block,
   (f) a single gear having teeth adapted to mesh with the rack,
   (g) said gear having a central opening,
   (h) an arm,
   (i) means pivotally mounting one end of said arm in back of and between the ends of said rack,
   (j) the other end of said arm including a reach extending into the opening in the gear,
   (k) said reach being loosely received in said opening,
   (l) said gear being loosely rotatably swingable by pivotal movement of the arm between two extreme positions on the rack,
   (m) said gear being forced into mesh with the rack by said arm at such extreme positions and being free to disengage from the rack when the arm is midway between said extreme positions,
   (n) said gear and line backing block being so spaced as to directly bear on opposite sides of a single line located therebetween when the gear is in an extreme position closest to the converging ends of the blocks,
   (o) whereby a line can be freely pulled between the gear and the line backing block in the direction of divergence of the blocks and will be held tightly between the gear and the line backing block when pulled in the opposite direction, and
   (p) whereby the gear can be rotated with respect to the rack when tension is not being exerted on the line in the direction of convergence of the blocks.

2. A gear action jam cleat as set forth in claim 1 wherein the arm is of spring material.

3. A gear action jam cleat as set forth in claim 2 wherein the pivotal mounting means comprises a helical torsion spring integral with the arm and received in a well in the gear backing block.

4. A gear action jam cleat as set forth in claim 3 wherein the torsion spring has a radially offset end received in an anchoring hole in the gear backing block.

5. A gear action jam cleat as set forth in claim 1 wherein the surface of the line backing block facing the gear backing block is perpendicular to the base and wherein the space between the gear and said surface of the line backing block is upwardly unrestricted so that a line can be freely inserted into said space and can be easily removed from said space, even when the gear is bearing on the line, simply by lifting the line upwardly.

References Cited by the Examiner

UNITED STATES PATENTS

| | | | |
|---|---|---|---|
| 1,218,752 | 3/17 | Farr | 24—136 |
| 1,811,942 | 6/31 | Kemper et al. | |
| 1,851,678 | 3/32 | Mayer | 24—244 |

FOREIGN PATENTS

| | | |
|---|---|---|
| 834,735 | 8/38 | France. |
| 2,947 | 1911 | Great Britain. |

DONLEY J. STOCKING, *Primary Examiner.*